(12) United States Patent
Nyce

(10) Patent No.: US 10,183,462 B2
(45) Date of Patent: Jan. 22, 2019

(54) PRE-FABRICATED CEILING ASSEMBLY AND METHOD OF FORMING

(71) Applicant: Oldcastle Light Building Products, LLC, Atlanta, GA (US)

(72) Inventor: Daniel M. Nyce, Perkasie, PA (US)

(73) Assignee: OLDCASTLE LIGHT BUILDING PRODUCTS, LLC, Atlanta, GA (US)

(*) Notice: Subject to any disclaimer, the term of this patent is extended or adjusted under 35 U.S.C. 154(b) by 0 days.

(21) Appl. No.: 15/236,162

(22) Filed: Aug. 12, 2016

(65) Prior Publication Data

US 2017/0044775 A1    Feb. 16, 2017

Related U.S. Application Data

(60) Provisional application No. 62/205,101, filed on Aug. 14, 2015.

(51) Int. Cl.
| | | |
|---|---|---|
| E04B 9/04 | (2006.01) | |
| E04F 13/077 | (2006.01) | |
| B32B 3/26 | (2006.01) | |
| B32B 5/02 | (2006.01) | |
| B32B 3/08 | (2006.01) | |
| E04B 1/348 | (2006.01) | |
| E04B 1/94 | (2006.01) | |
| E04B 9/00 | (2006.01) | |

(52) U.S. Cl.
CPC .............. *B32B 3/266* (2013.01); *B32B 3/085* (2013.01); *B32B 5/024* (2013.01); *E04B 9/045* (2013.01); *B32B 2262/101* (2013.01); *B32B 2307/3065* (2013.01); *B32B 2419/00* (2013.01); *E04B 1/34869* (2013.01); *E04B 1/941* (2013.01); *E04B 9/006* (2013.01); *E04B 9/0442* (2013.01)

(58) Field of Classification Search
CPC ......... E04B 9/0442; E04B 9/045; E04H 1/12; E04H 1/125
See application file for complete search history.

(56) References Cited

U.S. PATENT DOCUMENTS

| | | | | |
|---|---|---|---|---|
| 4,389,948 A | * | 6/1983 | Sands | ..................... E04H 1/125 109/79 |
| 5,426,900 A | * | 6/1995 | Springer | .................. A47K 4/00 4/460 |
| 6,220,388 B1 | * | 4/2001 | Sanborn | .................... E04B 1/86 181/290 |
| 6,443,257 B1 | | 9/2002 | Wiker et al. | |
| 6,872,343 B2 | | 3/2005 | Edwards et al. | |
| 8,182,643 B2 | | 5/2012 | Fanucci et al. | |
| 2001/0048175 A1 | | 12/2001 | Edwards et al. | |
| 2003/0154679 A1 | * | 8/2003 | Swiszcz | ................. E04B 9/001 52/506.07 |
| 2003/0159366 A1 | * | 8/2003 | Christensen | ........ E04B 1/34869 52/79.1 |

(Continued)

FOREIGN PATENT DOCUMENTS

DE     2907909 A1 *   9/1980   ............. A61H 33/06

*Primary Examiner* — Christine T Cajilig

(74) *Attorney, Agent, or Firm* — Sheridan Ross PC

(57) ABSTRACT

A prefabricated ceiling panel and method of forming the same is provided. The panel comprises various built-in features including cable trays, lighting elements, and other features. The panel further comprises a layered structure comprising a plurality of layers to increase the fire resistance, insulation, and/or structural features of the panel.

15 Claims, 3 Drawing Sheets

(56) References Cited

U.S. PATENT DOCUMENTS

| | | | |
|---|---|---|---|
| 2007/0116991 A1* | 5/2007 | Balthes | B29C 43/003 428/35.6 |
| 2009/0100769 A1* | 4/2009 | Barrett | A47K 4/00 52/35 |
| 2009/0235599 A1* | 9/2009 | Ware | B29C 65/5057 52/309.9 |
| 2012/0192503 A1* | 8/2012 | Connell | E04H 1/1261 52/79.1 |
| 2013/0014451 A1* | 1/2013 | Russell | E04B 1/34869 52/79.1 |
| 2013/0086849 A1* | 4/2013 | Clouser | E04B 1/34869 52/79.9 |
| 2013/0161331 A1* | 6/2013 | Pherson | B65D 88/14 220/560.01 |
| 2015/0027505 A1* | 1/2015 | Thompson | E04H 1/1205 135/92 |
| 2016/0339670 A1* | 11/2016 | Faotto | E04B 1/80 |

\* cited by examiner

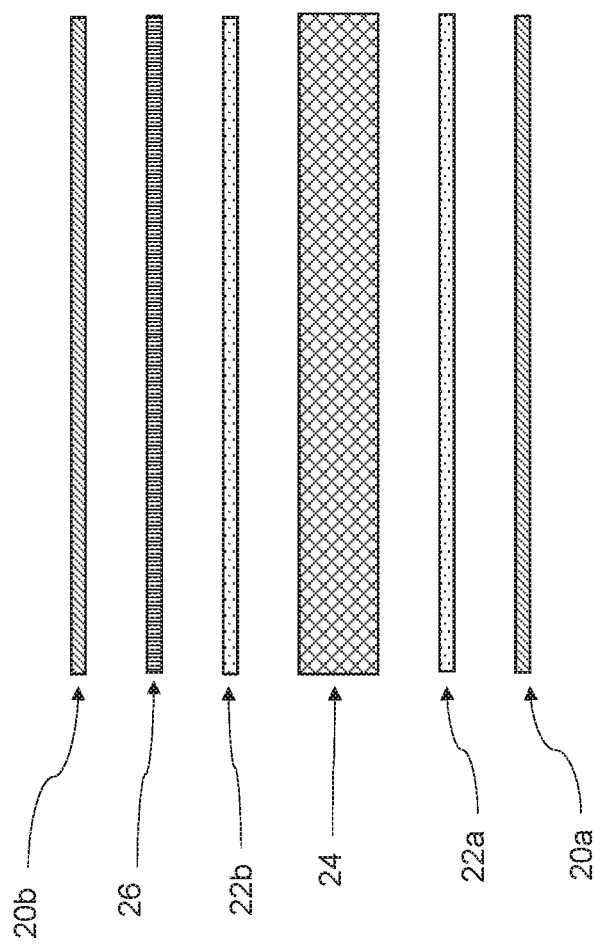

PRE-FABRICATED CEILING ASSEMBLY AND METHOD OF FORMING

This U.S. Non-Provisional Patent Application claims the benefit of priority from U.S. Provisional Patent Application Ser. No. 62/205,101, filed Aug. 14, 2015, the entire disclosure of which is incorporated by reference herein.

FIELD

The present disclosure relates generally to modular building units and structures. More specifically, the present disclosure relates to a pre-fabricated ceiling assembly with a plurality of layered materials or components, and methods of forming the same.

BACKGROUND

Known ceiling structures for modular building unit structures comprise highly labor-intensive structures and associated methods of forming. Typically, prior art systems comprise cutting or shaping a ceiling panel from multiple pieces of fiber rock or sheet rock. The panel or panels are typically formed by computer-numerical-control systems and devices, but may also be machined or formed by hand or more conventional methods. Steel studs and reinforcing structures are cut and formed to fit a particular ceiling panel, and a stud frame is assembled for each particular ceiling. A jig table is typically used for such assembly processes. The cut fiber rock is then formed into place on the stud frame by known securing methods including fasteners and adhesives. It is also known to provide the assembled ceiling panel on a vertical finishing table and employ a multi-step process to finish the panel to a level five finish, which is desirable or required for areas and rooms where lighting is an important consideration. As used herein, "level five" finishes include, for example, those described in the Gypsum Association published standard GA-214-10.

Prior art devices are generally labor intensive, expensive, and generally fail to provide a prefabricated ceiling structure that is adapted to and operable to be provided with a prefabricated building unit or structure. Further, these devices generally fail to disclose or provide enhanced safety features including, but not limited to flame retardant features.

SUMMARY

In view of the limitations present in modular ceiling assemblies, embodiments of the present disclosure provide novel pre-fabricated modular ceiling assemblies which are more efficient to manufacture, more systematic and organized for installation and more versatile in application and operation and more cost effective for mass manufacturing purposes, as shown and described herein.

U.S. Patent Application Publication No. 2013/0086849 to Clouser et al., which is hereby incorporated by reference in its entirety, discloses modular building structure with a ceiling. Various features and methods of forming a modular room or structure of Clouser are contemplated for use in embodiments of the present disclosure.

In various aspects of the present invention, a pre-fabricated ceiling assembly for use within a modular building structure (e.g. a pre-fabricated bathroom unit) is provided that increases efficiency during the manufacturing, assembly, and installation processes of the ceiling and the modular structure. In one embodiment, a prefabricated ceiling panel assembly is provided, the panel comprising a plurality of layers comprising a first woven glass layer, a fire retardant layer, and a second woven glass layer, and a surface layer. At least one of the plurality of layers is manufactured from a single sheet of material that is shaped to span an entire ceiling area of a modular structure ceiling space. The at least one of the plurality of layers comprises at least one pre-cut opening for receiving utilities and other features, and at least one of the plurality of layers comprises a flame-retardant material comprising a resistance to fire and/or smoke generation.

In preferred embodiments, a ceiling assembly is provided with a mono-formed composite ceiling prefinished texture and a fire retardant layer, such as an ASTM E84 polypropylene tri polymer honeycomb, and/or other flame retardant and resistant materials. U.S. Pat. No. 6,443,257 to Wiker et al., which is hereby incorporated by reference in its entirety, discloses a ceiling structure with fire-retardant properties including polyvinyl acetate glue and other halogenated fire suppressants. Such materials are contemplated for use with various embodiments of the present disclosure.

In various embodiments, a prefabricated ceiling panel and method of forming the same is provided. The panel(s) comprises various built-in features including cable trays, lighting elements, and other features. The panel further comprises a layered structure comprising a plurality of layers to increase the fire resistance, insulation, and/or structural features of the panel.

In certain embodiments, at least one layer of the ceiling panel is manufactured from a single sheet of material that is shaped to span an entire ceiling area of a modular structure (e.g. a modular bathroom unit) ceiling space. In preferred embodiments, the at least one layer comprises pre-cut openings for utilities, such as electrical components, lighting elements, air ducting, etc. The ceiling panel also preferably comprises at least one layer or material comprising a resistance to smoke generation as well as flame spread.

In one embodiment, a method of forming a ceiling panel assembly is provided, wherein the plurality of layers are joined or formed using a linear pultrusion impregnation system with unsaturated polyester resin solution at a temperature range of approximately 250-500 degrees Fahrenheit. The method may further comprise cost effective and novel fabrication practices to improve the speed, cost and quality of the product.

In one embodiment, a prefabricated ceiling panel assembly is provided, the assembly comprising a plurality of layers comprising a first woven glass layer, a fire retardant layer, and a second woven glass layer, and a surface layer. At least one of the plurality of layers is manufactured from a single sheet of material that is shaped to span an entire ceiling area of a modular structure ceiling space. At least one of the plurality of layers comprises at least one pre-cut opening, and at least the fire retardant layer comprises a flame-retardant material comprising a resistance to fire and smoke generation.

In one embodiment, a prefabricated ceiling panel assembly is provided, the assembly comprising a plurality of layers comprising an upper layer, a fire retardant layer, a woven glass layer, and a lower layer. At least one of the plurality of layers is manufactured from a single sheet of material this is shaped to span an entire ceiling area of a modular structure ceiling space. At least one of the plurality of layers is secured to at least one other layer by an adhesive. At least one of the plurality of layers comprises at least one pre-cut opening. At least the fire retardant layer comprises a flame-retardant material comprising a resistance to fire and smoke generation.

In one embodiment, a method of forming a ceiling panel assembly and providing the ceiling panel assembly on a modular building structure is provided. The method comprises the steps of forming at least one layer using a linear pultrusion impregnation system with unsaturated polyester resin solution at a temperature range of approximately 250-500 degrees Fahrenheit. The method further comprises the steps of providing a first woven glass layer, a fire retardant layer, and a second woven glass layer, and a surface layer. At least one of the plurality of layers is manufactured from a single sheet of material that is shaped to span an entire ceiling area of a modular structure ceiling space. At least one of pre-cut opening is provided through the plurality of layers to accommodate at least one of a lighting element, an air conduit, and a plumbing structure. At least one of the layers comprises a fire retardant layer comprising a flame-retardant material comprising a resistance to fire and smoke generation. The method further comprises a step of securing or joining the ceiling panel assembly to a modular building unit. In various embodiments, the modular building unit comprises a prefabricated room or component of a building structure.

In one embodiment, a modular building structure is provided, the structure comprising a plurality of substantially vertical sidewalls at least partially defining an interior volume of the modular building structure. A prefabricated ceiling panel assembly is provided and comprises an upper layer, a fire retardant layer, a woven glass layer, a lower layer, and a plurality of reinforcing members. At least one of the plurality of layers of the ceiling panel assembly is manufactured from a single sheet of material this is shaped to span an entire ceiling area of a modular structure ceiling space. At least one of the plurality of layers of the ceiling panel assembly comprises at least one pre-cut opening, and the fire retardant layer comprises a flame-retardant material comprising a resistance to fire and smoke generation. At least the lower layer of the prefabricated ceiling panel assembly is secured to an upper portion of at least one of the plurality of substantially vertical sidewalls. The modular building structure is operable to be inserted or installed in a larger building unit or project, and wherein the modular building structure comprises a prefabricated unit to increase the ease of construction of a larger building, dwelling, or structure. In various embodiments, modular building structure of the present disclosure comprise prefabricated plumbing and electrical components (for example) that may be connected to and/or integrated with similar components and systems in a larger building structure in which the modular structure is installed.

DESCRIPTION OF THE FIGURES

FIG. 3 is an exploded, cross-sectional elevation view of components or layers for forming a ceiling structure according to one embodiment of the present disclosure.

DETAILED DESCRIPTION

Figure 1:
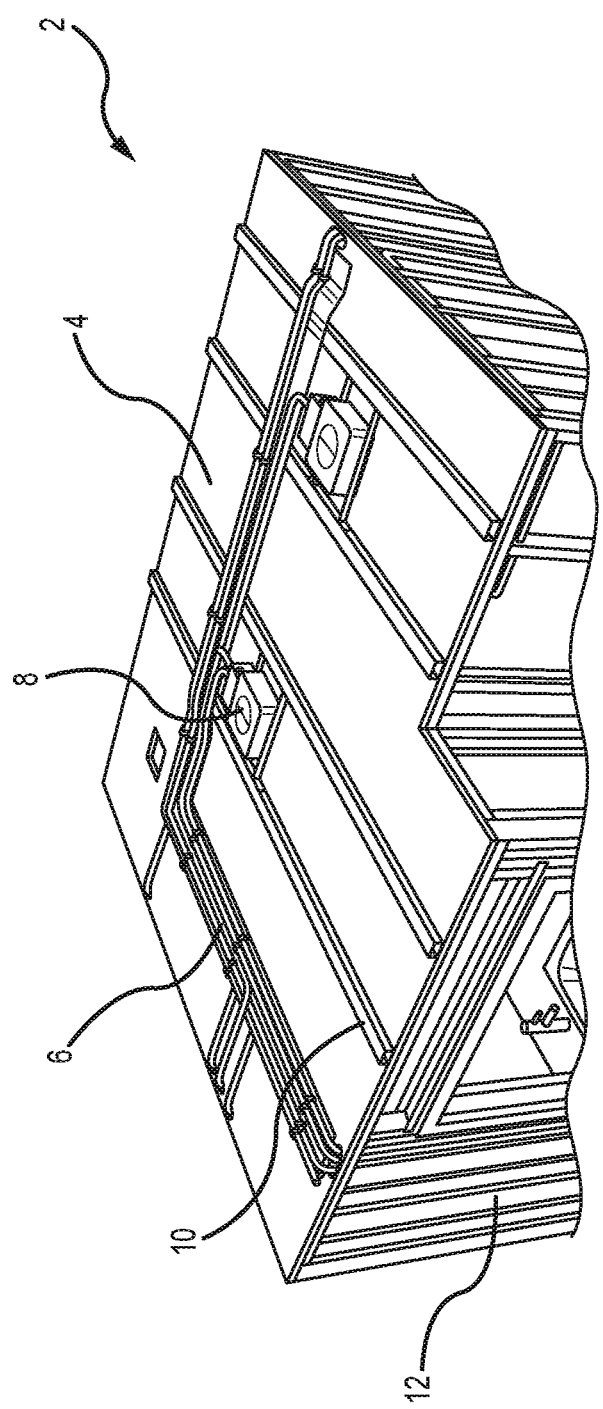
FIG. 1 is a top perspective view of a pre-fabricated ceiling structure and a building unit according to one embodiment of the present disclosure.

The following is a listing of components according to various embodiments of the present disclosure, and as shown in the drawings:

2 Ceiling Assembly
4 Main Ceiling Panel
6 Conduit
8 Lighting Element
10 Reinforcing Members
12 Prefabricated Building Unit
14 Apertures
20a, 20b Finishing Mat
22a, 22b Structural Mat
24 Fire Resistant Layer
26 Fire Resistant Veil FIG. 1 is a top perspective view of a pre-fabricated ceiling assembly 2 comprising a main ceiling panel 4, at least one electrical conduit 6, at least one lighting or fan assembly 8, a plurality of reinforcing members 10, and related adhesives and installation fixtures and hardware. In certain embodiments, the main ceiling panel 4 comprises a mono-formed composite ceiling with a prefinished texture including, for example, a polyester surface veil impregnated with unsaturated resin solution.

In various embodiments, a main ceiling panel is provided and comprises a plurality of layers. In one embodiment, the layers comprise a fiberglass or woven glass layer, such as an 1808 woven roving glass layer; a fire-retardant layer, such as an ASTM E84 polypropylene tripolymer honeycomb layer; an additional glass layer, such as an 1808 woven virgin glass layer; and a surface layer, such as a veil for aesthetic and/or acoustic purposes.

As shown in FIG. 1, the main ceiling panel 4 comprises a plurality of reinforcing members 10, such as steel studs, to provide structural support to the panel 4 and related components and accessories. The number and type of reinforcing members 10 may be varied based on the size, shape, thickness, structure, etc. of an associated ceiling panel 4. The ceiling panel 4 is preferably shaped, cut, or sized to fit a prefabricated building unit 12. The prefabricated building unit 12 may comprise any number and type of building units including, but not limited to, modular prefabricated bathroom units.

Figure 2:
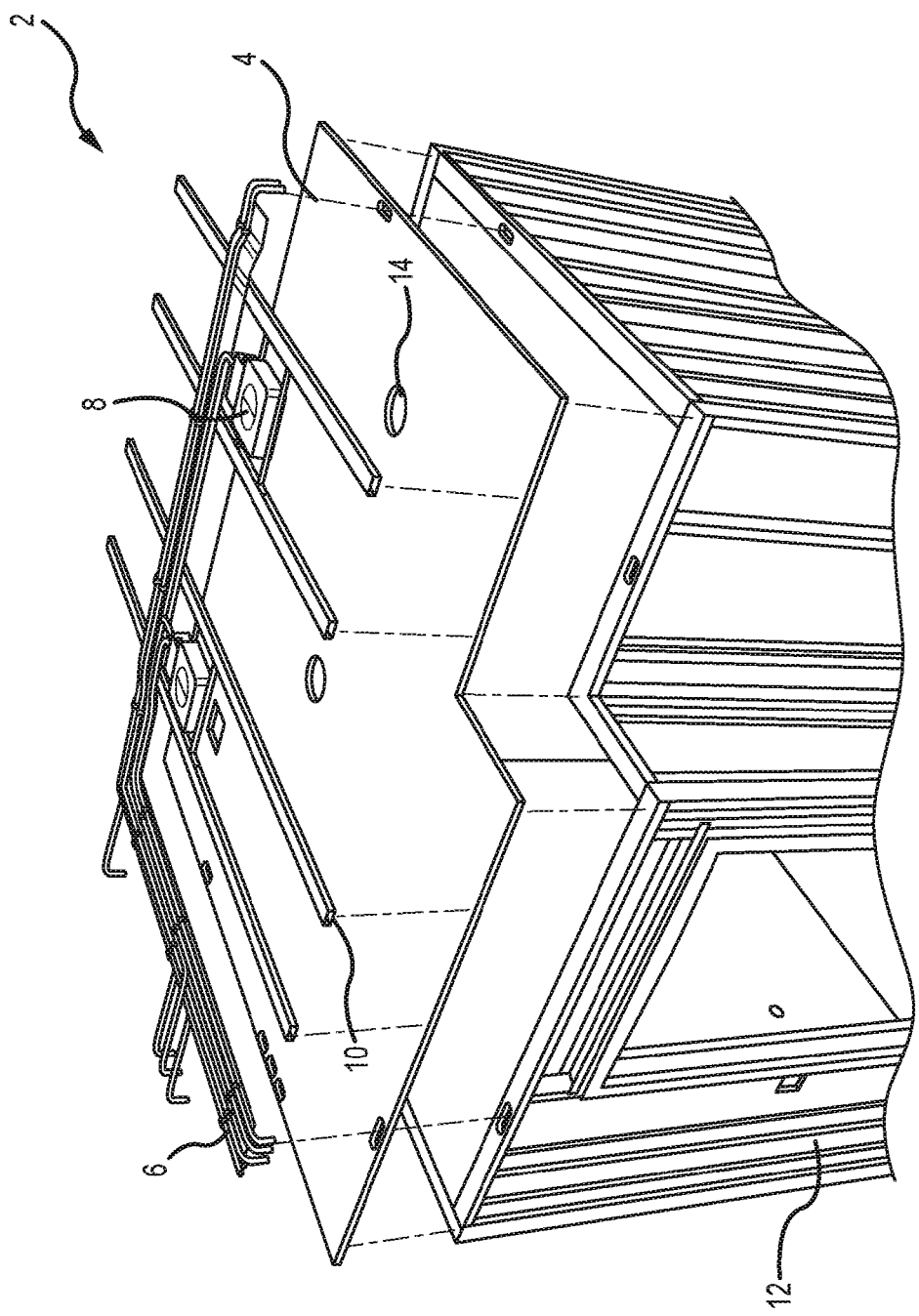
FIG. 2 is a top perspective view of a pre-fabricated ceiling structure and a building unit according to one embodiment of the present disclosure.

FIG. 2 is a partially exploded perspective view of a pre-fabricated ceiling assembly 2 comprising a main ceiling panel 4. As shown, the main ceiling panel 4 comprises a plurality of pre-formed cut-outs or apertures 14 to accommodate lighting and ducting features, for example.

FIG. 3 is an exploded, cross-sectional elevation view of components or layers for forming a ceiling structure according to one embodiment of the present disclosure. As shown, a ceiling panel or portion of a ceiling panel in accordance with one embodiment of the present disclosure comprises a first finishing mat 20a as a lower or base layer of the panel or structure. A first structural fiberglass mat 22a is provided above the first finishing mat 20a. A fire resistant layer 24 is provided as an interior layer, the fire resistant layer preferably comprising a honey-comb core layer with at least some fire resistant properties or treatment. The fire resistant layer 24 is provided between the first structural fiberglass mat 22a and a second structural fiberglass mat 22b. As shown, a fire resistant veil 26 is provided vertically above the second structural fiberglass mat 22b. A second finishing mat 20b is provided as an upper layer of the ceiling panel.

In various embodiments, including but not limited to the embodiment provided in FIG. 3, the layers are preferably laminated, joined or formed using a linear pultrusion impregnation system with unsaturated polyester resin solution at a temperature range of approximately 250-500 degrees Fahrenheit, and preferably approximately 325 degrees Fahrenheit. The pultrusion process of the present disclosure comprises a process wherein at least some of the layers provided in FIG. 3, for example, are bonded under heat and pressure. U.S. Patent Application Publication No. 2001/0048175 to Edwards et al., which is hereby incorporated by reference in its entirety, discloses a process for in-line forming of pultrusion composites. Processes and features of Edwards et al. may be employed in embodiments of the present disclosure. The present disclosure contemplated methods of forming a ceiling panel using pultrusion processes as opposed to convention wet molding of layers. U.S. Pat. No. 8,182,643 to Fanucci et al., which is hereby incorporated by reference in its entirety, provides a process for fabricating structure including a pultrusion process. Such features and methods are contemplated for use in combination with embodiments of the present disclosure. Pultrusion processes contemplated for use in forming ceiling structures according to various embodiments of the present disclosure have provided unforeseen and novel advantages over known construction and formation methods. For example, the use of an in-line pultrusion process in forming ceiling structures of the present disclosure have been shown to reduce or avoid the occurrence of swelling or bulging of the ceiling structure during and after formation. The application of heat and pressure to the various layers shown and described herein provides distinct advantages over known devices and methods. In certain embodiments, the bonding process is accomplished with the addition of a fire-resistant resin and finishing the product with a fire-resistant bonding coat.

What is claimed is:

1. A prefabricated ceiling panel assembly for a prefabricated building unit comprising:
   a plurality of layers joined or formed using a linear pultrusion impregnation process, the plurality of layers comprising a first inner layer, a first fiberglass structural layer adjacent to and in contact with the first inner layer, a fire resistant honeycomb layer adjacent to and in contact with the first fiberglass structural layer, a second fiberglass structural layer adjacent to and in contact with the fire resistant honeycomb layer, the second fiberglass structural layer provided on an opposing side of the fire resistant honeycomb layer relative to the first fiberglass structural layer, and an outer layer adjacent to and in contact with the second fiberglass structural layer;
   the plurality of layers being at least partially secured with an adhesive comprising a halogenated fire suppressant;
   wherein at least one of the plurality of layers is manufactured from a single sheet of material devoid of seams that is shaped to span an entire ceiling area of a modular structure ceiling space;
   wherein the prefabricated ceiling panel assembly is shaped and sized to a fit a prefabricated building unit and comprises at least one pre-cut opening operable to receive at least one of a lighting element, a duct and an electrical component;
   wherein the fire resistant honeycomb layer comprises a flame-retardant polypropylene tripolymer honeycomb layer between the first fiberglass structural layer and the second fiberglass structural layer; and
   wherein the ceiling panel assembly further comprises a plurality of steel studs to provide structural support to the panel.

2. The prefabricated ceiling panel assembly of claim 1, wherein at least one of the first fiberglass structural layer and the second fiberglass structural layer comprises an 1808 woven glass layer.

3. The prefabricated ceiling panel assembly of claim 1, wherein the first inner layer comprises a veil for aesthetic and/or acoustic purposes.

4. The prefabricated ceiling panel assembly of claim 1, wherein the first inner layer is operable to be provided proximal an interior volume of a modular building structure.

5. The prefabricated ceiling panel assembly of claim 4, wherein the first inner layer is provided on the lower surface of the prefabricated ceiling panel.

6. A prefabricated ceiling panel assembly comprising:
   a plurality of layers comprising an upper layer, a fire-retardant layer, first and second fiberglass structural layers, and a lower layer;
   wherein the fire-retardant layer is provided between and in contact with the first and second fiberglass structural layers and is adhered to the first and second fiberglass structural layers;
   wherein the first fiberglass structural layer is provided between and in contact with the fire-retardant layer and the upper layer and is adhered to the upper layer, and the second fiberglass structural layer is provided between and in contact with the fire-retardant layer and the lower layer and is adhered to the lower layer;
   wherein at least some of the plurality of layers are adhered with an adhesive comprising a halogenated fire suppressant;
   the assembly being manufactured from a single sheet of material that is shaped to span an entire ceiling area of a modular structure ceiling space devoid of seams;
   at least one of the plurality of layers secured to at least one other layer by an adhesive and joined or formed using a linear pultrusion impregnation process;
   wherein the assembly comprises at least one pre-cut opening;
   wherein at least the fire-retardant layer comprises a polypropylene honeycomb material comprising a resistance to fire and smoke generation; and
   wherein the ceiling panel assembly further comprises a plurality of steel studs on the upper layer to provide structural support to the panel.

7. The prefabricated ceiling panel of claim 6, wherein the upper layer comprises a woven glass layer.

8. The prefabricated ceiling panel of claim 6, wherein the lower layer comprises a surface layer.

9. A modular building structure comprising:
   a plurality of substantially vertical sidewalls at least partially defining an interior volume of the modular building structure;
   a prefabricated ceiling panel assembly comprising a lower layer, a first and second woven glass structural layer, a honeycomb layer adjacent to the first and second woven glass structural layers, an upper layer, and a plurality of reinforcing members;
   wherein the honeycomb layer is provided between and in contact with the first and second woven glass structural layers and is adhered to the first and second woven glass structural layers with an adhesive comprising a halogenated fire suppressant;
   wherein the first woven glass structural layer is provided between and in contact with the honeycomb layer and the upper layer and is adhered to the upper layer, and the second woven glass structural layer is provided between and in contact with the honeycomb layer and the lower layer and is adhered to the lower layer;
   at least one of the layers of the ceiling panel assembly being manufactured from a single sheet of material that is shaped to span the length and the width of the modular building structure without any seams or connections;

at least one of the layers of the ceiling panel assembly comprising at least one pre-cut opening; and at least one of the layers comprising a flame-retardant material comprising a resistance to fire and smoke generation; and wherein at least the lower layer is secured to an upper portion of at least one of the plurality of substantially vertical sidewalls; and wherein the ceiling panel assembly further comprises a plurality of steel studs to provide structural support to the panel.

10. The modular building structure of claim 9, further comprising a lighting element provided within the at least one pre-cut opening.

11. The modular building structure of claim 9, further comprising plumbing features provided within the modular building structure.

12. The modular building structure of claim 9, wherein the upper layer comprises a woven glass layer.

13. The prefabricated ceiling panel of claim 9, wherein the lower layer comprises a surface layer.

14. The prefabricated ceiling panel of claim 9, wherein the lower layer defines an upper limit of the interior volume of the modular building structure.

15. The prefabricated ceiling panel of claim 9, wherein at least one of the layers comprises a veil for aesthetic and/or acoustic purposes.

* * * * *